United States Patent
Walton

[15] 3,650,056
[45] Mar. 21, 1972

[54] ANIMATED AQUATIC DISPLAY

[72] Inventor: Lorraine J. Walton, Route 4, Innisfail, Alberta, Canada

[22] Filed: Apr. 20, 1970

[21] Appl. No.: 30,124

[52] U.S. Cl. ........................................................ 40/106.25
[51] Int. Cl. ..................................................... G09f 19/02
[58] Field of Search ................. 40/106.31, 106.45, 326, 126, 40/106.51, 106.25; 43/26.2; 46/92, 243; 119/3, 5

[56] References Cited

UNITED STATES PATENTS

| | | | |
|---|---|---|---|
| 622,545 | 4/1899 | Schoknecht | 40/106.45 |
| 1,188,198 | 6/1916 | Oshima | 40/326 |
| 1,471,885 | 10/1923 | Dessau | 46/92 |
| 2,320,145 | 5/1943 | LaDue | 43/26.2 |
| 3,085,361 | 4/1963 | Rhodes | 43/26.2 |
| 3,239,956 | 3/1966 | Canonica | 40/126 X |
| 3,271,897 | 9/1966 | Gelinas | 46/92 |

*Primary Examiner*—Robert W. Michell
*Assistant Examiner*—Wenceslao J. Contreras

[57] ABSTRACT

A construction employing a plurality of mechanical fish which float together with live fish within a fishbowl, each of the mechanical fish including an electric motor driving a propeller for propelling the fish ahead, the motors being connected by relatively thin wires extending externally of the fish body and connected to batteries positioned within the bottom of the fish bowl, and each mechanical fish including a permanent magnet for positioning the fish relative to other adjacent fish of mechanical type, and each mechanical fish further including a weight for positioning it at a preset elevation within the water.

1 Claims, 4 Drawing Figures

PATENTED MAR 21 1972
3,650,056
Fig. 1
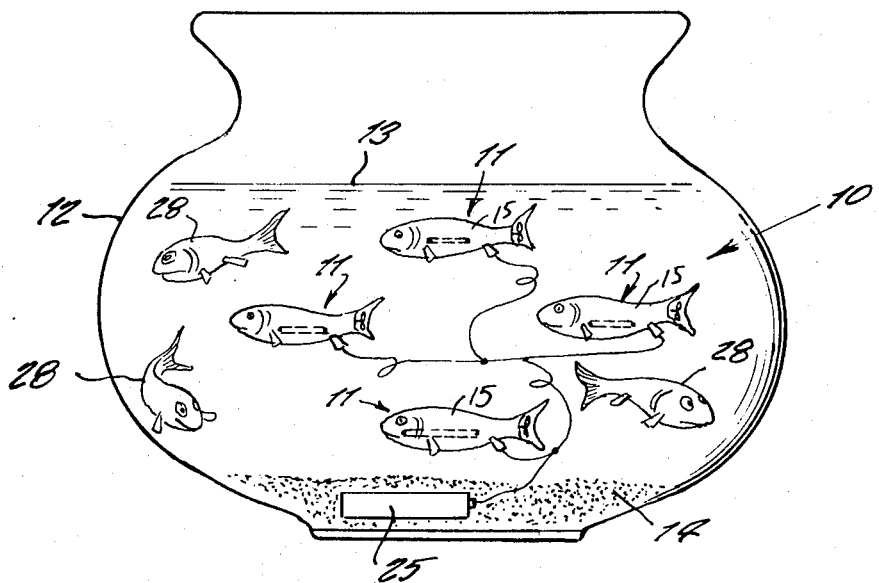
Fig. 2
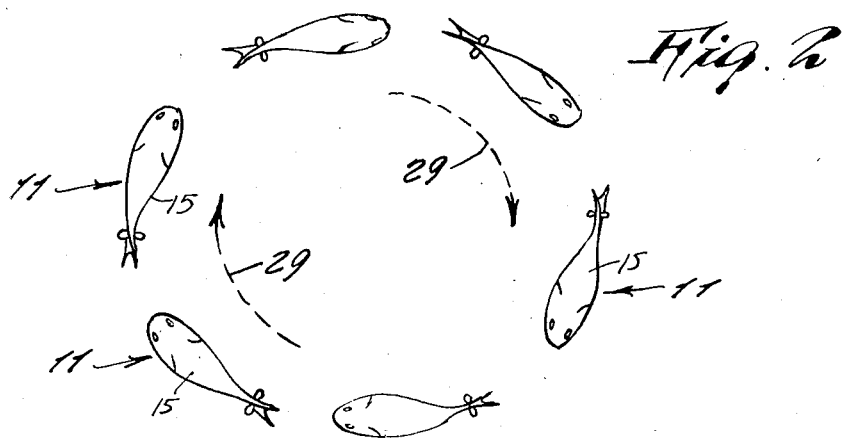
Fig. 3
Fig. 4
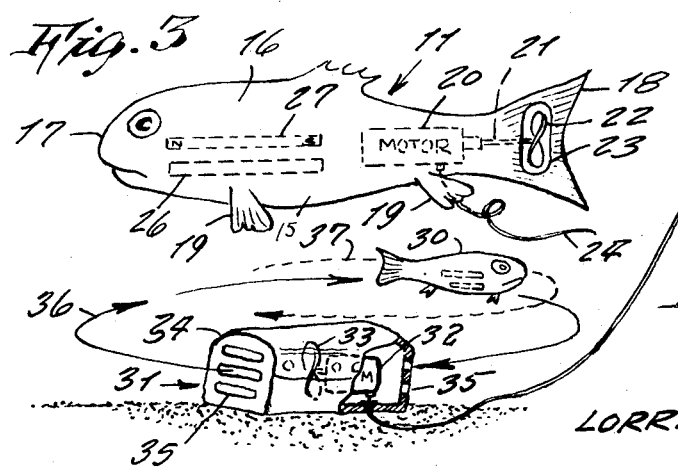
INVENTOR
LORRAINE J. WALTON

ANIMATED AQUATIC DISPLAY

This invention relates generally to mechanical fish.

A principal object of the present invention is to provide a care free fish construction which comprises a plurality of electrically controlled mechanical fish which move around a fish bowl automatically thus providing animation to an observer.

Another object of the present invention is to provide a care free fish construction wherein there are a plurality of mechanical fish which move together in a same direction so as to suggest a school of fish moving through the water.

Still another object of the present invention is to provide a care free fish construction wherein the mechanical fish may be contained within a fish bowl that also contains live fish.

Still a further object of the present invention is to provide a care free fish construction wherein there is also included an auxiliary water impeller contained within the bottom of the fish bowl and which promotes a swirling motion to the water so that mechanical fish may travel in a circular movement around the fish bowl for a pleasing observation to a beholder.

Still a further object of the present invention is to provide a care free fish construction wherein each mechanical fish includes a permanent magnet so as to control the position of each mechanical fish respective to an adjacent one thereto, so that the mechanical fish may face in a same direction while traveling.

Still a further object is to provide a care free fish construction wherein each mechanical fish includes a specific weight which automatically positions it within a controlled depth of the fish bowl water.

Other objects of the present invention are to provide a care free fish construction which is simple in design, inexpensive to manufacture, rugged in construction, easy to use and efficient in operation.

These and other objects will be readily evident upon a study of the following specification and the accompanying drawing wherein:

FIG. 1 is a side elevation view of a fish bowl shown including the present invention there within, FIG. 2 is a top plan view showing the mechanical fish in a traveling pattern, FIG. 3 is a side elevation view of one of the mechanical fish, and FIG. 4 is a side elevation view shown partly in cross section and illustrating a water impeller position within the bottom of the fish bowl.

Referring now to the drawing in detail, the reference numeral 10 represents a care free fish construction according to the present invention wherein there are a plurality of mechanical fish 11 which may be placed within a mechanical fish bowl 12 containing a quantity of water 13 and also a sand 14 on the bottom thereof.

Each of the mechanical fish 11 comprises a body 15 mounted into the configuration of a conventional fish, the body being made of any durable material such as plastic, rubber or the equivalent material.

The body 16 includes a fish head 17 at one end thereof and a fish tail at the other end thereof, the fish body also including various fins 19.

Within the fish body 16, a hollow compartment is provided containing an electric motor 20, the motor 20 having a motor shaft 21 to which a propeller 22 is attached, the propeller 22 extending externally of the fish body 16, and as shown in FIG. 3, being positioned preferably in a cutout opening 23 formed in the tail 18.

The motor 20 is connected by means of a relatively very thin electric wire 24 so that the same is not readily perceptible, the wire 24 extending externally of the fish body 16 and being connected to a thermostat and batteries 25 positioned within the bottom of the fish bowl, as shown in FIG. 1.

As is readily evident in FIG. 1, the wires 24 of each of the mechanical fish may be connected electrically together so that a singular wire thereof communicates with the batteries and the thermoswitch 25.

In order that each of the fish will float within a predetermined elevation of the water 13, each of the fish contains a lead rod 26 there within, the weight of the lead rod being relatively larger or smaller so that certain of the mechanical fish will float higher in the water while others will float at a lower elevation, as is evident in FIG. 1.

In order that all of the mechanical fish be made to move in a forwardly direction, it is necessary, as shown in FIG. 2, that they are each pointed in a proper direction. This is accomplished by means of a permanent magnet 27 positioned within each of the mechanical fish, the permanent magnet 27 having a north pole at one end thereof and a south pole at the opposite end thereof.

In each of the fish, the same pole faces forwardly and an opposite pole faces rearwardly whereby all of the north poles face in the same direction. Thus the fish will align in a same directional travel due to the like poles of two different fish repelling each other and wherein accordingly the fish will be positioned so that they resemble to an observer a school of fish swimming together in a common direction.

As is also shown in FIG. 1, the present invention can be included in a fish bowl which additionally includes live fish 28 swimming therein and which of course are free to travel in any desired direction and thus further increasing the animation to an observer.

In operative use, when the circuit between the batteries and the motor is turned on, the propellers 22 will rotate, thus causing the mechanical fish to swim forwardly, as indicated by the arrows 29 in FIG. 2, so that they resemble a school of fish traveling together.

In a modified construction shown in FIG. 4 of the drawing, a mechanical fish 30 is shown which includes the permanent magnet 27 and the weight 26 for purposes as above described, but which does not include the motor and propeller. This form of fish is activated by means of an accessory water impeller 31 positioned within the bottom of the fish bowl, the mechanical water impeller including an electrical motor 32 driving a propeller 33, the motor and propeller being contained within an attractive and decorative housing 34 which in the present instant resembles a treasure chest such as are suggested resting on the bottom of the sea from pirate ships that have sunk.

Alternately the housing may comprise a sunken vessel design, or any other decoration. The housing 34 includes opening 35 on opposite ends thereof so to permit water 13 to circulate through the housing due to the action of the propeller 33.

In operative use, it is now evident that as the water courses along the line, as indicated by arrows 36, the fish 30 courses along a line as indicated by the dotted arrows 37.

What I now claim is:

1. In an animated aquatic display, the combination of a fish tank, a plurality of mechanical fish each of which comprises a hollow body containing an electric motor having a motor shaft extending outwardly of said body, a propeller on an exterior end of said shaft, said propeller being located within the confines of a transverse opening in a tail at a rear of said body, an electric wire connected at one end to said motor extending outwardly of said body and tetheringly connected to a battery and thermoswitch in a bottom of said fish tank, water in said tank for said mechanical fish to float in said tank, a lead rod in each said fish of a specific weight that is different to weights of said rods in the other said fish so that said fish float at different elevations, and each said fish body having a permanent magnet therewithin, said magnet in each said fish having a like magnetic pole in a forward position thereof and a like magnetic pole in a rear position thereof so that said fish float in a same direction and to an observer resemble a school of actual fish swimming together in a common direction.

* * * * *